UNITED STATES PATENT OFFICE.

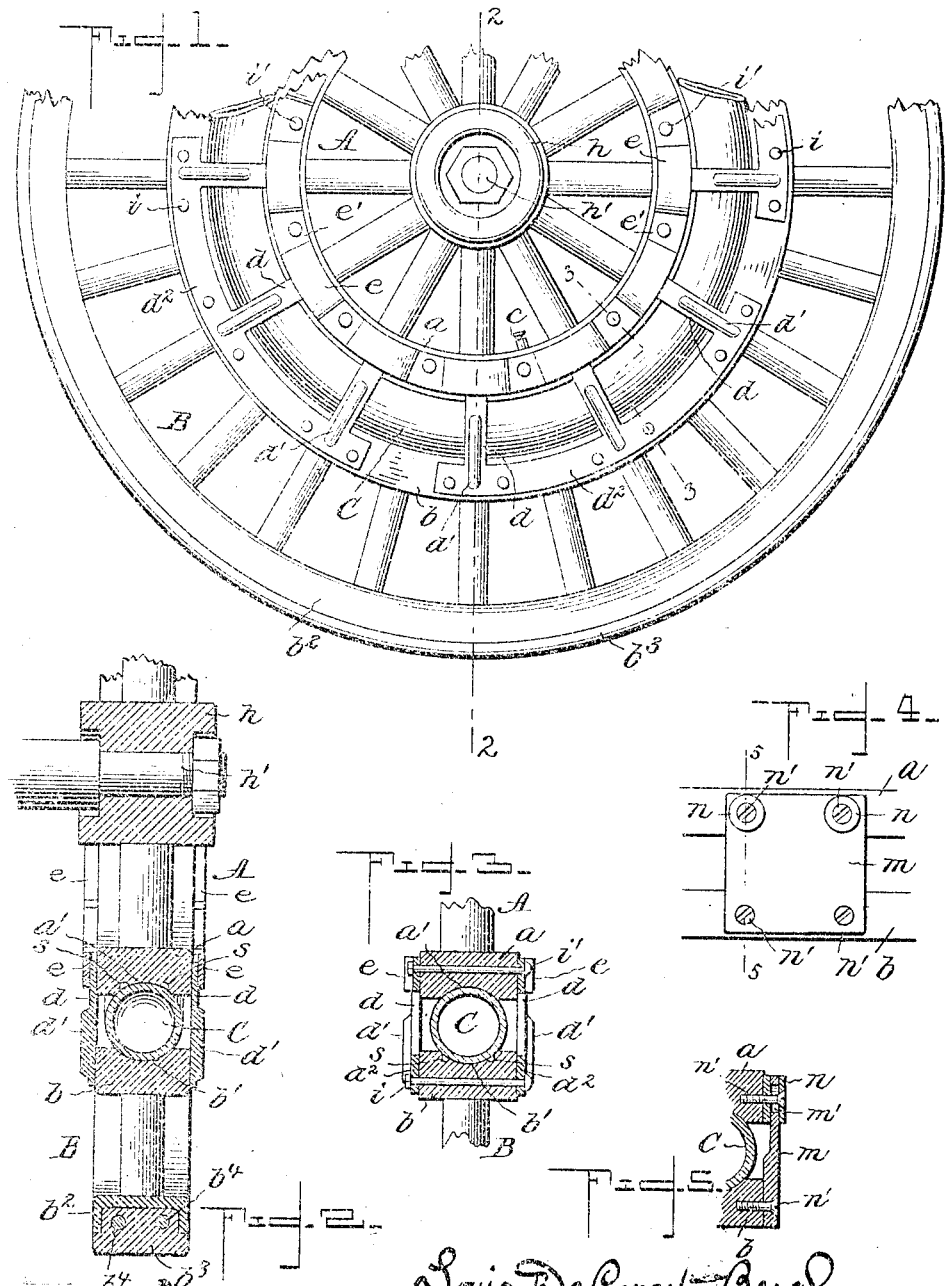

LOUIS DE COPPET BERGH, OF NEWPORT, RHODE ISLAND.

VEHICLE-WHEEL.

No. 852,254.  Specification of Letters Patent.  Patented April 30, 1907.

Application filed April 16, 1906. Serial No. 311,935.

*To all whom it may concern:*

Be it known that I, LOUIS DE COPPET BERGH, a citizen of the United States, residing at Newport, in the county of Newport and State of Rhode Island, have invented certain Improvements in Vehicle-Wheels, of which the following is a specification.

This invention relates to vehicle wheels, and is more especially an improvement in that class of wheels intended for use on motor vehicles or automobiles where resiliency is required to absorb the shock or jar incident to the passage of the vehicle over rough or uneven places in the roadway. In this class of vehicles it is customary to provide the wheels with pneumatic tires constructed of rubber, but inasmuch as in use such tires are susceptible to puncture and other injuries which often result in more or less serious accident various means have been suggested for maintaining the inflation of the tire and for protecting the rubber tread-surface thereof, but in nearly every case these appliances if at all effective seriously affect the resiliency of the tire and are therefore objectionable.

The object of my invention is to employ the customary inflated rubber tube or pneumatic tire in the construction of a wheel which will possess the resiliency and other advantages of a pneumatic tired wheel, and yet so locate the inflated tube within the wheel that it will not be liable to puncture and will receive but a minimum amount of wear, being located some distance from the tread of the wheel.

With this principal object in view the invention contemplates the production of a resilient vehicle wheel comprising annular sections between which is interposed an inflated tube, which latter will readily yield to take up any shock or jar to which the wheel may be subjected.

The invention further contemplates certain features of construction, whereby the sections are connected to maintain them in proper relation and prevent lateral movement of one section upon the other.

The invention is hereinafter fully described, and what I claim as new and desire to protect by Letters Patent is more specifically set forth in the appended claims.

In the accompanying drawing, which forms a part of this specification—Figure 1 is a side elevation, illustrating a vehicle wheel constructed in accordance with my invention. Fig. 2 is a vertical sectional view on the line 2—2 of Fig. 1. Fig. 3 is a similar view on the line 3—3 of Fig. 1. Fig. 4 is a detail view, showing a slight modification of the means for connecting the sections of the wheel together. Fig. 5 is a sectional view on the line 5—5 of Fig. 4.

Like letters and numerals of reference indicate like parts in all the views of the drawing.

In carrying out my invention the wheel is constructed of two sections, the inner or hub section A, and the outer or tread section B, and said sections are of such relative size as to leave a space between them, such space being occupied by an inflated rubber tube C, similar to the ordinary pneumatic tire. For the purpose of receiving this inflated tube the outer rim $a$ of the hub-section A is provided circumferentially with a groove $a'$, while the inner rim $b$ of the tread-section B is provided with a groove $b'$. It will be understood, of course, that the rubber tube is inserted between the sections A and B in a deflated condition, and when inflated through the medium of the usual valve $c$, it will expand into the grooves and occupy the entire space between the sections; thereby producing a substantial wheel. However, though the inflated tube C serves in a great measure to maintain the tread-section B in proper alinement or relative position to the hub-section, it is found desirable to augment this connection by means of certain devices which will be hereinafter fully described.

The outer rim $b^2$ of the tread-section B may be equipped with any style of tire, in the present instance an ordinary solid rubber tire, $b^3$, being shown and provided with the usual retaining wires $b^4$. Similarly the hub $h$ may be of any approved pattern to receive the axle-spindle $h'$. It will be readily seen that in this construction of wheel the outer or tread-section B is permitted a yielding movement which is limited or affected by the resiliency of the inflated rubber tube, so that the wheel as a whole will be resilient and readily take up any shock or jar without imparting it to the axle and other parts of the vehicle.

For the purpose of increasing the stability of the wheel, and more especially to maintain the tread-section B at all times in alinement with the hub-section A, the rims $a$ and $b$ of the respective sections are connected by means of bars $d$ secured to one of said rims and engaging keepers $e$ secured to the other rim, whereby said bars have a sliding movement in the keepers to permit of a vertical movement of the tread-section independent of the hub-section, and yet will effectually prevent independent lateral movement of said tread-section, inasmuch as the free ends of said bars are confined between the rim $a$ and the outer portions of the keepers. The keepers are of such length as to permit of a slight independent movement of either one of the wheel sections in the direction of rotation of the wheel. The connecting bars $d$ are reinforced by means of webs $d'$, and these terminate near the keepers $e$ to allow the required movement of the tread-section while yet preventing any excessive movement in case the tube C should become deflated from any cause.

The bars $d$ are preferably formed integrally with plates $d^2$, which are bolted to the rim $b$ by means of the bolts $i$, said bars and plates being formed in series or sets to facilitate their renewal in case of wear, etc. The keepers $e$ are formed on an annular plate $e'$, which latter is bolted to the rim $a$ by means of the bolts $i'$.

In Figs. 4 and 5 I have illustrated a modification of the means for connecting the sections of the wheel together, in which instance rectangular plates $m$ are employed, and secured to the rims $a$ and $b$ by means of screws $n'$, the screws which enter the rim $a$ passing through slots $m'$ in the plate so as to permit of the required movement of the tread-section, for the purpose heretofore explained. Washers $n$ are placed over the plate and under the heads of the screws, and serve to cover the slots $m'$. It is obvious that other means may be employed for connecting the sections A and B together so as to prevent lateral movement of the tread-section, while permitting of a direct movement thereof to take up the shock and jar in conjunction with the inflated tube. The inflated tube C is preferably cemented to one of the rims, preferably the rim $a$, and said tube may be and preferably is provided with lugs or teats $s$ which enter corresponding recesses in the rims, to prevent longitudinal movement or "creeping" of the tube.

From the foregoing description, in connection with the accompanying drawing, it will be readily seen that I provide a form of vehicle wheel which will give the required resiliency or elasticity and yet is not subject to the rapid wear and injury incident to the use of the ordinary pneumatic tire.

Having described my invention I do not wish to be limited to the particular construction of detail parts herein shown, as it is obvious changes may be made without departing from the spirit and scope of my invention, for instance instead of the tread section comprising two rims connected by spokes as shown said section may consist of a single rim only.

I claim:—

A vehicle wheel of the character described, comprising an inner or hub section, an outer or tread section, an inflated tube interposed between said sections, a plate on one of the sections providing keepers, and plates on the other section having bars extending into the keepers, said bars being provided with ribs terminating near the keepers, substantially as shown and for the purpose set forth.

In testimony whereof I have signed my name to this specification in the presence of two subscribing witnesses.

LOUIS DE COPPET BERGH.

Witnesses:
 CHARLES D. BURNES,
 HENRY U. HITCHCOCK.